United States Patent [19]

Eoll et al.

[11] Patent Number: 5,249,249
[45] Date of Patent: Sep. 28, 1993

[54] CABLE UTILIZING MULTIPLE LIGHT WAVEGUIDE STACKS

[75] Inventors: Christopher K. Eoll; Andrew S. Dodd; Richard S. Wagman, all of Hickory, N.C.

[73] Assignee: Siecor Corporation, Hickory, N.C.

[21] Appl. No.: 750,415

[22] Filed: Aug. 27, 1991

[51] Int. Cl.⁵ .............................................. G02B 6/44
[52] U.S. Cl. .................... 385/114; 385/112; 385/110
[58] Field of Search .............. 385/114, 112, 109, 105, 385/100, 110, 106, 111

[56] References Cited

U.S. PATENT DOCUMENTS

| | | | |
|---|---|---|---|
| T900,002 | 7/1972 | Wielar, II | 385/114 |
| 4,679,897 | 7/1987 | Driskel | 385/114 |
| 4,743,085 | 9/1988 | Jenkins et al. | 350/96.23 |
| 4,804,245 | 2/1989 | Katayose et al. | 385/114 X |
| 4,846,566 | 7/1989 | Barnett et al. | 350/96.23 |
| 4,861,135 | 8/1989 | Rohner et al. | 385/114 |
| 4,900,126 | 2/1990 | Jackson et al. | 385/114 |
| 4,997,257 | 3/1991 | Spedding | 385/114 X |
| 5,062,685 | 11/1991 | Cain et al. | 385/114 |
| 5,163,116 | 11/1992 | Oestreich et al. | 385/111 |

Primary Examiner—John D. Lee
Assistant Examiner—Phan T. Heartney
Attorney, Agent, or Firm—J. David Abernethy

[57] ABSTRACT

A light waveguide cable includes a compartment holding at least two side-by-side stacks of light waveguide ribbons. The cable is so dimensioned that the order of the ribbons within any stack, and the relative positions of the stacks with respect to each other within any compartment, do not change under normal cable handling conditions.

3 Claims, 2 Drawing Sheets

CABLE UTILIZING MULTIPLE LIGHT WAVEGUIDE STACKS

BACKGROUND OF THE INVENTION

Optical fiber ribbons, which are generally rectangular in cross-section, comprise a plurality of essentially parallel light waveguides encased in a ribbonizing material, normally a plastic. An advantage of an optical cable utilizing light waveguide ribbons is that the cable is thought by some to be easier to splice, and individual light waveguides can be located by the position in a ribbon.

Optical ribbon cables utilizing stacks of optical fiber ribbons have been proposed. Such cables have compartments holding a plurality of such ribbons where the cross-section of a compartment is much greater than the cross-section of the enclosed ribbons. The open space within compartments takes up a significant amount of the cable volume. This prevents such designs from being used for truly high fiber density optical cables.

SUMMARY OF THE INVENTION

In contrast to prior cables having compartments holding only one stack of light waveguide ribbons, cables according to the present invention comprise a compartment holding at least two side-by-side stacks of light waveguide ribbons. A stack may be bound by a thin layer of thermoplastic extruded over the stack, or a tape or thread wrapped around the stack. Each of the stacks within the compartment is bound sufficiently tightly that the relative order of the light waveguide ribbons within any stack does not change under normal cable handling conditions. In a preferred embodiment, the compartment is sized so that the amount of open space around the stacks within the compartment is limited so that the relative position of the light waveguide ribbon stacks cannot change during normal cable handling. On the other hand, the compartment holds the stacks sufficiently loosely that the stacks are able to slip relative to one another and to the compartment walls so that fiber strains can be reduced by stack slippage when the cable is bent.

As an alternative to being bound by a tape or thread or an extruded thermoplastic layer, the adjacent light waveguide ribbons in a stack may be bound to each other by an adhesive, which may be rather weak such that ribbons may be peeled apart from each other without destroying the integrity of the ribbon material.

If a tape or thread is utilized to hold a stack together, the tape or thread may be helically wrapped around the stack. Alternatively, a tape may be applied longitudinally, where the tape is folded around the stack and an overall helical binder holds the tape in place.

The thin extruded layers over the stacks or the binder threads or tapes or the light waveguides themselves may be color coded in such a way that each stack in a cable may be uniquely identified. Further color coding of the individual light waveguides in a stack may be used to uniquely identify each ribbon in a stack and each fiber in a ribbon.

BRIEF DESCRIPTION OF THE DRAWINGS

The detailed description of the preferred embodiments is made with reference to the drawings, in which.

DETAILED DESCRIPTION OF THE PREFERRED EMBODIMENTS

Figure 1:
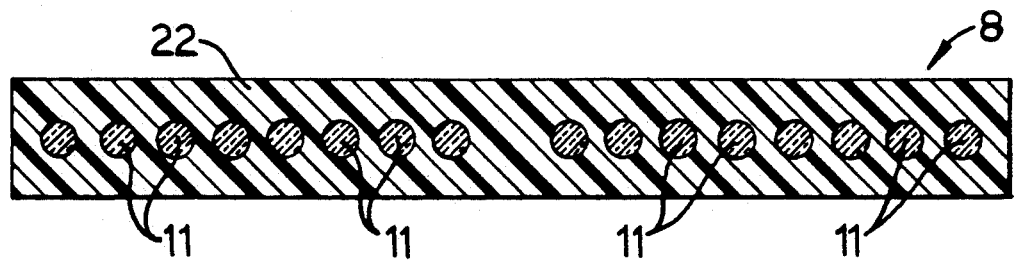
FIG. 1 is an end view of a light waveguide ribbon.

A light waveguide ribbon 8 with an acrylate copolymer 22 holding sixteen light waveguides 11 is shown in FIG. 1. For illustrative purposes, a ribbon thickness of 0.3 mm and width of 4.3 mm are used in the examples. Three embodiments of a stack of light waveguide ribbons are shown in FIGS. 2, 3, and 4.

Figure 2:
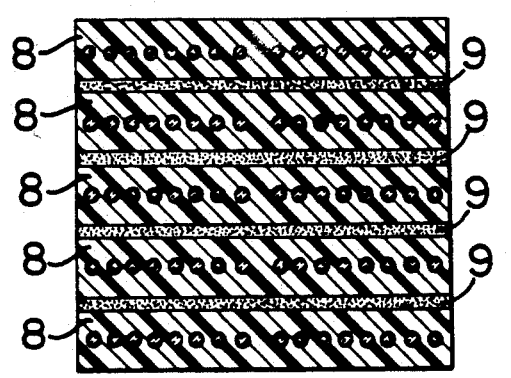
FIGS. 2 and 3 are end views of a stack of light waveguide ribbons.

In FIG. 2, light waveguide ribbon stack 12 comprises ribbons 8 which are held together by very thin layers of adhesive 9, which is preferably sufficiently weak to allow the ribbons 8 to be peeled apart without damage to the integrity of material 22. Possible adhesives include a hot melt adhesive based on atactic polypropylene or polybutylene or on the copolymer poly(ethylene-vinyl acetate). Other possible adhesives are an ultraviolet light curable acrylate copolymer or one based on a silicone that is heat curable.

Figure 3:
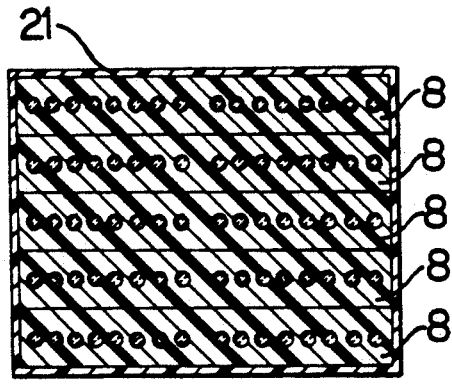
Figure 4:
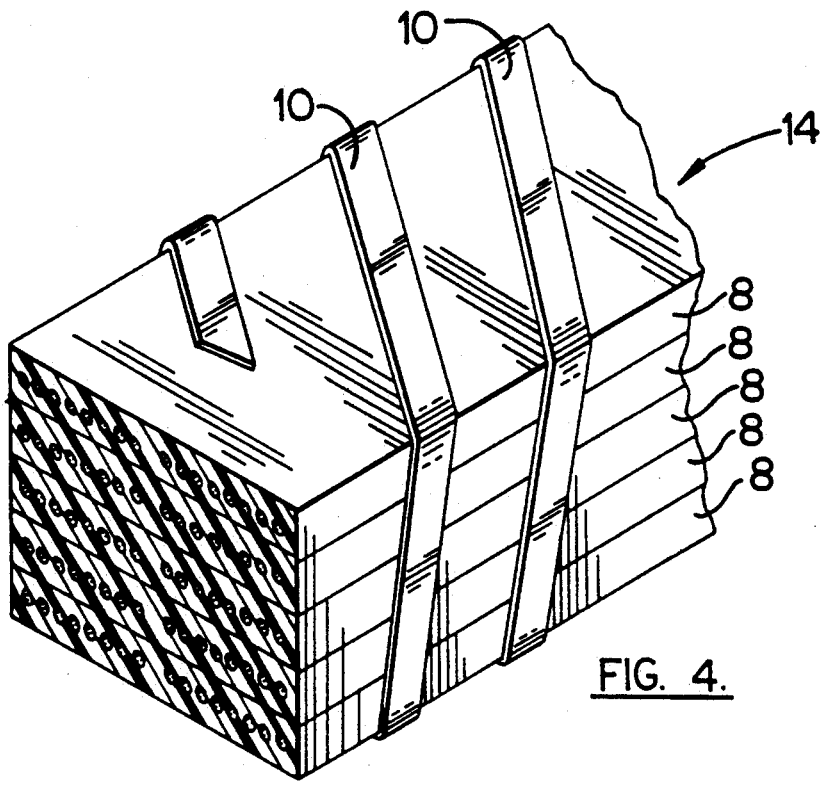
FIG. 4 is a perspective view of a stack of light waveguide ribbons.

In FIG. 3, a 0.25 mm thick layer of plastic 21 is extruded over ribbons 8 to form light waveguide ribbon stack 13. In FIG. 4, a thread or tape 10 is wrapped around ribbons 8 to form light waveguide ribbon stack 14. A Mylar ® tape which is 0.03 mm thick may be used for this purpose.

Figure 5:
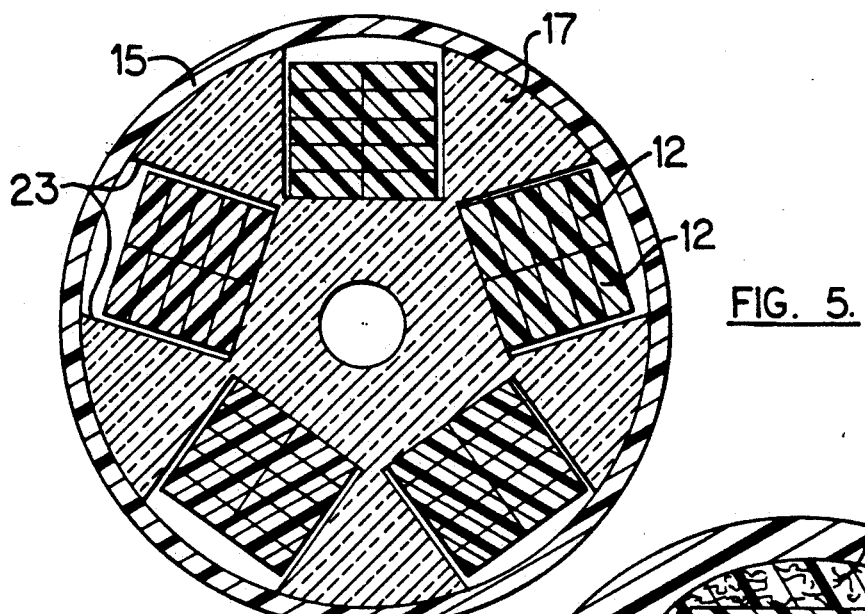
FIG. 5 is an end view of a slotted core cable containing five compartments, each housing light waveguide ribbon stacks according to FIGS. 2, 3 or 4.
Figure 7:
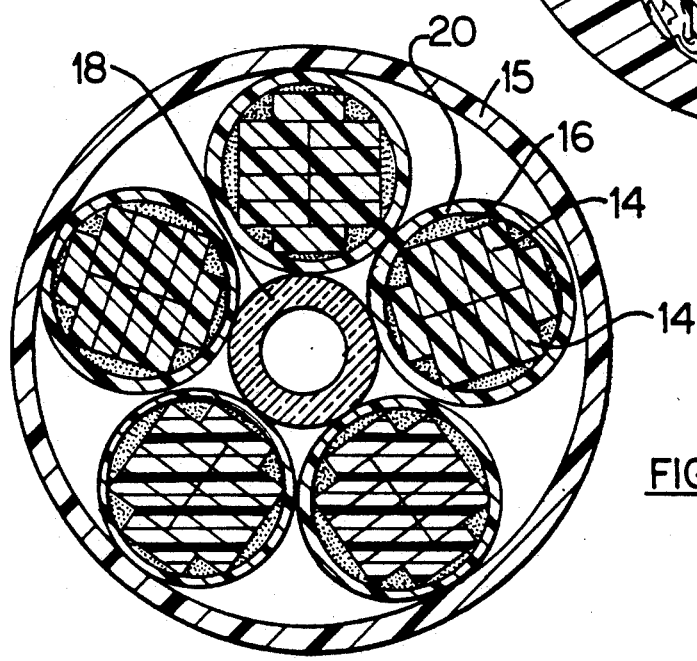

FIGS. 5 and 7 are two embodiments of various cables according to the invention. Any of the stack embodiments used in FIGS. 2-4 may be used in either of the cable embodiments in FIGS. 5 and 7.

FIG. 5 is a slotted core cable cross-section with a plastic member 17 having slots 23 each holding ten stacks of light waveguide ribbons, where five ribbon stacks 12 are laid on top of each other on one side of each slot 23 and five stacks are laid on top of each other on the other side of slot 23, adjacent to the first set of stacks. The slot width can be 9.4 mm and the slot depth can be 8.3 mm when the stack embodiment in FIGS. 2 or 4 is used. A plastic jacket 15 is extruded around member 17 to turn each slot 23 into a compartment. Within a compartment, ribbon stacks 12 are free to move with respect to each other, but not enough to change their relative position with respect to each other. With appropriate adjustments to the dimensions of each slot, each slot could hold a different number of stacks of ribbons. Similarly, the slotted core could contain a different number of slots.

The slots in the core can be in a helical configuration longitudinally. When the stacks are laid in the slots during manufacture, the length of a stack is greater the farther it is from the bottom of its slot. The stacks can be advantageously manufactured in a separate operation, then paid off and laid in the slots in the same operation as that in which the slotted plastic rod is extruded. The core with its filled slots can then be jacketed in a subsequent operation.

Figure 6:
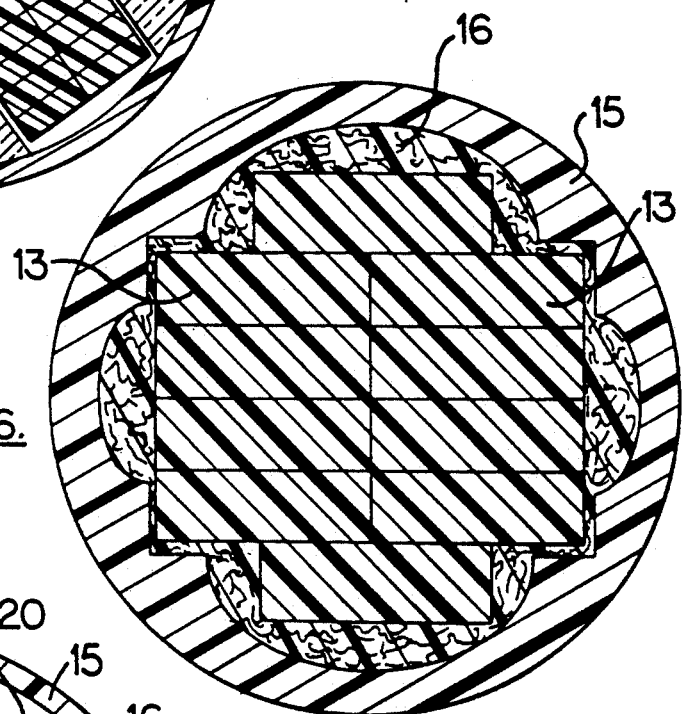
FIG. 6 is an end view of a strandable element, the jacket of which defines a compartment holding light waveguide ribbon stacks according to FIGS. 2, 3, or 4; and, FIG. 7 is an end view of a cable made by stranding together five elements according to FIG. 6.

FIG. 6 is a strandable core element including a jacket consisting of a polymer tube and a cavity within the jacket, where the cavity contains ten stacks. Two sets of four stacks lie side-by-side, where each set consists of four ribbon stacks 13 on top of each other. In addition, additional stacks 13 are set on opposite ends of that group of eight ribbon stacks. Polymer tube 15 can have an outside diameter of 12 mm when the stack embodiment in FIG. 2 or 4 is used. The inside surface of the tube is contoured, in part to provide stress relief at the corners of the central rectangular group of eight stacks and in part to help ensure that the stacks cannot slip far enough from the position shown in the diagram that the order of the stacks might change.

In manufacturing the strandable core element in FIG. 6, fiber strains in the final cable are reduced if the strandable element is taken up on a reel or in a tray in such a way that the radius of curvature of the element on the reel or in the tray is approximately equal to the radius of curvature the element will have in the final cable; with such a take-up, the stacks on the outside of the bend can be longer than those on the inside without the individual stacks exhibiting longitudinal strain, and if the elements are also stranded together using rigid frame stranding the stacks in the final cable can be largely free of the longitudinal strain that they would otherwise exhibit as a result of the stranding.

FIG. 7 is a cable design utilizing a central strength member 18 and five of the elements shown in FIG. 6 though some of the detail shown in FIG. 6 is not reproduced in FIG. 7. The design shown is assembled using rigid frame stranding. A filling compound 16 is shown as used in the spaces within the strandable elements in FIGS. 6 and 7, but its use is optional. The overall cable jacket 15 encloses the five elements stranded about the central strength member, and the jacket also encloses additional strength or water-blocking materials in the interstices of the strandable elements as desired. Ribbon stacks in each of the several compartments are free to move with respect to each other when the cable is bent but the relative position of the ribbon stacks in each compartment does not change.

With appropriate dimensional adjustments, the core element in FIG. 6 could hold a different number of ribbon stacks. Similarly, the cable in FIG. 7 could contain a different number of strandable elements.

The above embodiments are just illustrative of the invention. Other designs which embody the principles of the invention and which fall within the spirit and scope thereof may be devised by those skilled in the art.

What is claimed is:

1. A cable comprising a compartment loosely holding at least two stacks of light waveguide ribbons, said stacks abutting each other in a side-by-side relation, wherein the relative order of the light waveguide ribbons within any stack does not change under normal cable handling conditions and the compartment and stacks of light waveguide ribbons are so dimensioned that the relative position of the stacks of light waveguide ribbons in the compartment does not change during normal cable handling conditions.

2. A cable comprising a compartment loosely holding at least two units abutting each other in a side-by-side relation, each unit comprising a thin layer of thermoplastic extruded over a stack of light waveguide ribbons, wherein the compartment and units are so dimensioned that the relative position of the units in the compartment does not change under normal cable handling conditions.

3. A cable comprising a compartment holding at least two stacks of light waveguide ribbons each bounded by a helically wrapped tape or thread, said stacks abutting each other in a side-by-side relation, wherein the relative order of the light waveguide ribbons within any stack cannot change under normal cable handling conditions and the compartment and ribbons are so dimensioned that the relative position of the stacks of light waveguide ribbons in the compartment does not change during normal cable handling conditions.

* * * * *